US008825270B2

(12) United States Patent
Chen

(10) Patent No.: US 8,825,270 B2
(45) Date of Patent: Sep. 2, 2014

(54) METHOD AND APPARATUS FOR INDICATING AN AUTOMOTIVE DIAGNOSTIC URGENCY

(75) Inventor: Leon Chen, Laguna Hills, CA (US)

(73) Assignee: Innova Electronics, Inc., Irvine, CA (US)

(*) Notice: Subject to any disclaimer, the term of this patent is extended or adjusted under 35 U.S.C. 154(b) by 559 days.

(21) Appl. No.: 12/721,005

(22) Filed: Mar. 10, 2010

(65) Prior Publication Data

US 2011/0224866 A1 Sep. 15, 2011

(51) Int. Cl.
*G06F 7/00* (2006.01)
*G07C 5/08* (2006.01)

(52) U.S. Cl.
CPC .......... *G07C 5/0808* (2013.01); *G07C 2205/02* (2013.01)
USPC ....... 701/29.6; 701/31.4; 701/31.5; 701/29.1; 340/438; 340/439; 340/459; 340/461; 702/183; 702/119; 702/120; 702/123

(58) Field of Classification Search
CPC .......... G06F 7/00; G07C 5/008; G06Q 30/06; G05B 23/02
USPC ......... 701/33, 29.6, 31.4, 31.5, 183; 340/438, 340/439, 459, 461; 702/183, 119, 120, 123, 702/182, 188
See application file for complete search history.

(56) References Cited

U.S. PATENT DOCUMENTS

D334,560 S 4/1993 Wilson
D377,622 S 1/1997 Chen et al.
5,635,841 A 6/1997 Taylor
5,767,681 A 6/1998 Huang
6,000,413 A 12/1999 Chen
6,499,385 B2 12/2002 Protti
6,687,584 B2 2/2004 Andreasen et al.
6,868,369 B2 3/2005 Huang et al.
6,940,270 B2 9/2005 Chen
6,941,203 B2 9/2005 Chen
6,947,816 B2 9/2005 Chen
D510,287 S 10/2005 Chen et al.
6,968,733 B2 11/2005 Andreasen et al.
7,030,742 B2 4/2006 Treadway
7,073,714 B2 * 7/2006 Namaky et al. .......... 235/462.15
7,085,680 B2 8/2006 Huang
7,116,216 B2 10/2006 Andreasen et al.
RE39,619 E 5/2007 Andreasen et al.
D545,223 S 6/2007 Chen (Continued)

OTHER PUBLICATIONS

Product sheet—Actron Pocketscan Plus CP9410, www.actron.com/product_detail.php?pid=16350, 2008.

(Continued)

*Primary Examiner* — John R Olszewski
*Assistant Examiner* — Truc M Do
(74) *Attorney, Agent, or Firm* — Stetina Brunda Garred & Brucker

(57) ABSTRACT

Provided is a method for determining the urgency for repairing a diagnostic condition in a vehicle. Upon determining the repair urgency, a driver may decide to continue driving (in the case of a "low" urgency determination), or cease driving (in the case of a "high" urgency determination). The urgency status may also enable a driver to shop around for the repair (in the event of a "low" urgency status), or to seek immediate assistance (in the event of a "high" urgency status).

24 Claims, 2 Drawing Sheets

(56) References Cited

U.S. PATENT DOCUMENTS

| | | | | |
|---|---|---|---|---|
| D558,621 | S | 1/2008 | Rich et al. | |
| D559,137 | S | 1/2008 | Protti | |
| D560,129 | S | 1/2008 | Rich et al. | |
| D560,527 | S | 1/2008 | Rich et al. | |
| 7,325,775 | B2 | 2/2008 | Chen | |
| D563,249 | S | 3/2008 | Chen | |
| D569,280 | S | 5/2008 | Chen | |
| 7,376,497 | B2 | 5/2008 | Chen | |
| D571,241 | S | 6/2008 | Andreasen et al. | |
| 7,437,227 | B2 | 10/2008 | Andreasen et al. | |
| D581,822 | S | 12/2008 | Madison et al. | |
| 7,464,000 | B2 | 12/2008 | Huang | |
| D590,387 | S | 4/2009 | Chen | |
| 7,520,668 | B2 | 4/2009 | Chen | |
| RE40,798 | E | 6/2009 | Chen | |
| RE40,799 | E | 6/2009 | Chen | |
| 7,603,293 | B2 | 10/2009 | Chen | |
| D610,586 | S | 2/2010 | Chen | |
| 8,024,083 | B2 * | 9/2011 | Chenn | 701/31.5 |
| 2004/0016804 | A1 * | 1/2004 | Namaky et al. | 235/435 |
| 2006/0293811 | A1 | 12/2006 | Andreasen et al. | |
| 2007/0005201 | A1 | 1/2007 | Chen | |
| 2007/0073459 | A1 * | 3/2007 | Webster et al. | 701/29 |
| 2007/0124040 | A1 | 5/2007 | Chen | |
| 2008/0027604 | A1 * | 1/2008 | Oesterling | 701/30 |
| 2008/0119981 | A1 * | 5/2008 | Chen | 701/33 |
| 2008/0228344 | A1 * | 9/2008 | Sampson et al. | 701/33 |
| 2009/0006476 | A1 | 1/2009 | Andreasen et al. | |
| 2009/0055045 | A1 * | 2/2009 | Biswas et al. | 701/33 |
| 2009/0259358 | A1 * | 10/2009 | Andreasen | 701/33 |
| 2009/0276115 | A1 | 11/2009 | Chen | |
| 2010/0005010 | A1 | 1/2010 | Chen | |
| 2013/0204485 | A1 * | 8/2013 | Chen et al. | 701/29.6 |

OTHER PUBLICATIONS

User's Manual—Actron Pocketscan Plus CP9410, 2007.

* cited by examiner

METHOD AND APPARATUS FOR INDICATING AN AUTOMOTIVE DIAGNOSTIC URGENCY

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure is related generally to automotive diagnostics, and more specifically to a method and system of determining the urgency of repairing a diagnostic condition.

Today's vehicles are generally complex electro-mechanical systems which tend to breakdown over time. One or more of the vehicle's sub-systems may begin to operate outside of normal operating parameters, which may cause a vehicle diagnostic condition. The vehicle diagnostic conditions may affect the vehicle's performance, or may ultimately cause the vehicle to cease operation. Therefore, it is important to detect the vehicle diagnostic conditions in order to maintain the vehicle in a safe and efficient operating condition.

Most vehicles include a basic diagnostic indicator to alert the driver of the presence of a diagnostic condition. This basic diagnostic indicator may be located on the dashboard, or another readily observable position from the driver's seat. In most vehicles, the basic diagnostic indicator is a "check engine" light, which illuminates when a diagnostic condition arises. Although the basic diagnostic indicator is useful in alerting the driver of a vehicle diagnostic condition, it typically does not identify the particular vehicle diagnostic condition. Rather, the driver is merely notified that there may be a problem with the vehicle.

In order to obtain a more comprehensive diagnostic analysis of the vehicle, it may be necessary to download information from the vehicle's onboard computer. The onboard computer is generally in communication with the vehicle's various sub-systems to obtain data from the sub-systems. Most sub-systems generate diagnostic trouble codes when a diagnostic condition arises. Each diagnostic trouble code may be associated with a specific diagnostic condition, and once the diagnostic trouble codes are triggered, they may be stored on the vehicle's onboard computer and downloaded therefrom by an automotive scan tool for diagnostic analysis. For a comprehensive diagnostic analysis, the diagnostic trouble codes are uploaded to a diagnostic database having a plurality of diagnostic trouble codes and their associated diagnostic condition. The vehicle may be repair upon identifying the diagnostic condition plaguing the vehicle.

However, the urgency of completing the repair may not be the same for all diagnostic conditions. In particular, the same diagnostic condition may be more urgent in some vehicles, and less urgent in others. For instance, a loose or disconnected gas cap may trigger a diagnostic trouble code, yet may not require immediate attention. Conversely, a malfunction related to the air bag system may also trigger a diagnostic trouble code, and require immediate attention. Still further, a problem with the vehicle's balance bar may trigger a diagnostic trouble code, and be a more urgent condition in an SUV (which is more susceptible to a roll over), and a less urgent condition in a sedan.

A basic urgency indicator (as discussed above) may not provide the driver with an indication as to the urgency of addressing the problem with the vehicle. Furthermore, conventional automotive scan tools may receive the diagnostic trouble codes triggered by the vehicle, to allow the user to identify the vehicle's diagnostic condition(s); however, such conventional automotive scan tools typically do not alert the user as to the urgency of fixing the diagnostic condition(s).

In view of the foregoing, there is a need in the art for an automotive diagnostic device which advantageously communicates the urgency related to fixing a vehicle's diagnostic condition.

BRIEF SUMMARY

Provided is a method for determining the urgency associated with repairing a diagnostic condition in a vehicle. Upon determining the repair urgency, a driver may decide to continue driving (in the case of a "low" urgency determination), or cease driving (in the case of a "high" urgency determination). The urgency status may also enable a driver to shop around for the repair (in the event of a "low" urgency status), or to seek immediate assistance (in the event of a "high" urgency status).

One embodiment includes a method of identifying the urgency of treating a diagnostic condition of a vehicle. The method includes forming a first urgency database and a second urgency database. The first urgency database includes a plurality of diagnostic trouble codes, wherein each diagnostic trouble code is associated with a respective first urgency status. The first urgency status is one of a low urgency and a high urgency. The second urgency database includes a plurality of combinations of diagnostic trouble codes, wherein each combination of diagnostic trouble codes is associated with a respective second urgency status. The second urgency status is one of a low urgency and a high urgency. The diagnostic trouble codes are received at the first urgency database to determine the first urgency status. The diagnostic trouble codes are also received at the second urgency database to determine the second urgency status. An overall diagnostic urgency is determined, with the diagnostic urgency being one of a high diagnostic urgency and a low diagnostic urgency. The diagnostic urgency is the high diagnostic urgency when at least one of the first urgency status and the second urgency status is high urgency. The diagnostic urgency is the low diagnostic urgency when the first urgency status and the second urgency status are both low urgency.

The first urgency status may be dependent upon a vehicle characteristic defined by the vehicle. The method may also include the steps of determining the vehicle characteristic and receiving the vehicle characteristic at the first urgency database and/or the second urgency database. The vehicle characteristic may include the vehicle identification number, which may be decoded to determine further information pertaining to the vehicle.

Another embodiment includes a diagnostic urgency tool for determining an urgency associated with a diagnostic condition of a vehicle, wherein the vehicle includes an onboard computer for storing trouble codes. The diagnostic urgency tool includes a tool connector connectable to the onboard computer to download the trouble codes. A first urgency database is in operative communication with the urgency detection tool, and is configured to determine a first urgency status associated with each trouble code. The first urgency status is either a low urgency or a high urgency. An urgency indicator is in communication with the first urgency database and is configured to activate an urgency signal corresponding to a diagnostic urgency.

The diagnostic urgency tool may include a second urgency database to arrange the plurality of trouble codes into a combination of trouble codes, and to determine a second urgency status for each combination of trouble codes. The second urgency is either a low urgency or a high urgency.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
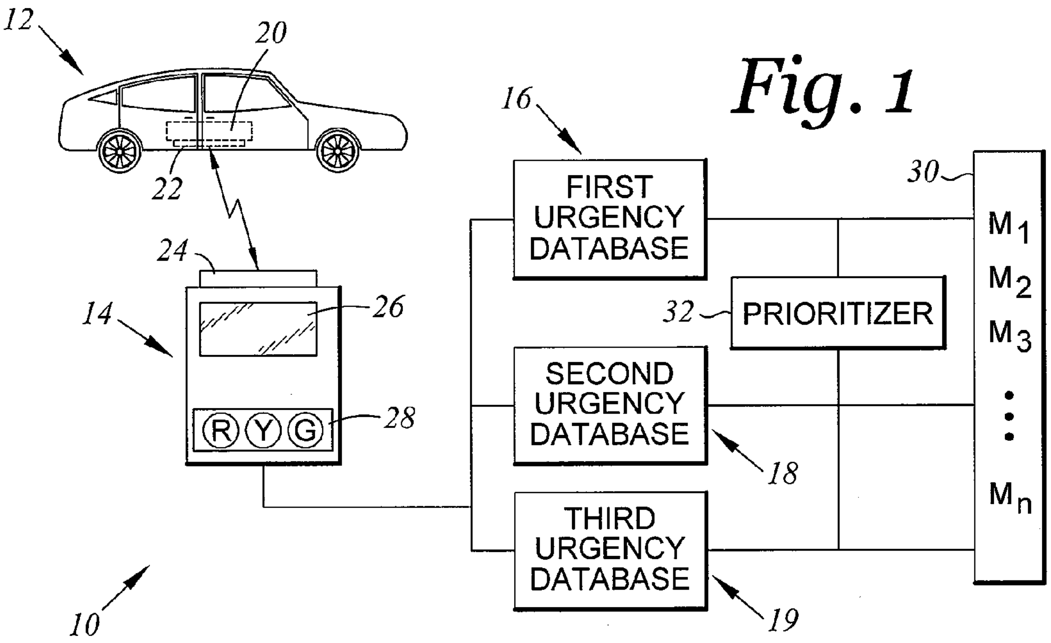
FIG. 1 is a schematic view of a diagnostic urgency detection system.

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Referring now to the drawings, where the showings are for purposes of illustrating an embodiment of the present disclosure, and not for purposes of limiting the same, there is shown a system for determining the urgency of an automotive diagnostic condition. The system allows a user to download diagnostic data from a vehicle and analyze the data to determine the urgency related to a vehicle's diagnostic condition. This provides the user with a means of determining whether the diagnostic condition should be addressed immediately, or whether the diagnostic condition can be addressed at a later time. The urgency indicator system is a safety feature for a driver, who may assume that there is nothing wrong with his vehicle. In this respect, the urgency indicator system may alert the driver of a problem which the driver may not be aware of. The diagnostic urgency system may also provide an economic benefit to a driver who assumes the diagnostic condition must be fixed immediately (i.e., at a premium), rather than shopping around for a better deal. In addition, the diagnostic urgency system may provide convenience for a driver by informing the driver that the diagnostic condition may be fixed at a more convenient time, or alternatively that the vehicle should be fixed immediately to avoid an inconvenient breakdown.

Referring now specifically to FIG. 1, which provides a system level overview of the diagnostic urgency system 10, there is shown a vehicle 12, an urgency indicator tool 14, a first urgency database 16, a second urgency database 18, and a third urgency database 19. The vehicle 12 includes an on-board computer 20, which is in communication with the various systems and components comprising the vehicle 12. The on-board computer 20 may generate and/or store data during the operation of the vehicle 12. A portion of that data may be diagnostic data which relates to the health and operability of the vehicle 12. The diagnostic data may include one or more diagnostic trouble codes, which are common to OBD-II compliant vehicles. The discussion below pertains to analysis of diagnostic trouble codes for purposes of determining the urgency of a diagnostic condition; however, it is understood that other diagnostic data may also be used and analyzed in other embodiments of the urgency detection system 10.

The urgency detection tool 14 may be placed in communication with the on-board computer 20 to download the diagnostic trouble codes therefrom. The on-board computer 20 includes a computer connector 22 which interfaces with the urgency detection tool 14. Likewise, the urgency detection tool 14 includes a tool connector 24 which interfaces with the on-board computer 20. In this manner, the computer connector 22 may interface directly with the tool connector 24. The communication between the on-board computer 20 and the urgency detection tool 14 may be by way of wireless communication (i.e. BLUETOOTH), or wired communication (i.e. physical connection between the computer connector 22 and the tool connector 24, or the use of an intermediate cable). Once the urgency detection tool 14 is connected to the on-board computer 20, the diagnostic trouble codes may be downloaded from the on-board computer 20 to the urgency detection tool 14. It is contemplated that the downloading of the diagnostic trouble codes may take place on a real time basis (i.e., during operation of the vehicle) or from data stored on the on-board computer 20 from previous operation of the vehicle 12.

The urgency detection tool 14 may include an internal memory (i.e. flash memory) to store the diagnostic trouble codes downloaded from the on-board computer 20. A display screen 26 may also be included on the urgency detection tool 14 to display data to a user, such as the particular trouble codes received from the vehicle 12, or information related to the diagnostic urgency. The urgency detection tool 14 further includes a diagnostic indicator 28 to indicate the urgency associated with the diagnostic trouble codes received from the vehicle 12. As explained in more detail below, the urgency may be classified as "high" or "low". In some embodiments, a "medium" diagnostic urgency may also be determined.

The diagnostic urgency is determined by comparing the diagnostic trouble codes with information in one or more urgency databases. In the system 10 depicted in FIG. 1, three databases 16, 18, 19 are used to determine the diagnostic urgency of the vehicle 12; although, those skilled in the art will appreciate that fewer than three urgency databases, or more than three urgency databases may be used without departing from the spirit and scope of the present disclosure.

The first urgency database 16, second urgency database 18, and third urgency database 19 are disposed in operative communication with the urgency detection tool 14. According to one embodiment, the databases 16, 18, 19 are located at a remote location and may be accessed by the urgency detection tool 14 via a network, such as the Internet. In this respect, the urgency detection tool 14 may upload the diagnostic trouble codes to an intermediate device (not shown), such as a computer or cellphone, for further communication to the databases 16, 18. For more information related to using a cellphone for communications between the urgency detection tool 14 and a remote database, please see U.S. Patent Application Publication No. 2007/0005201, entitled Cellphone Based Vehicle Diagnostic System, the contents of which are expressly incorporated herein by reference. Alternatively, the urgency detection tool 14 may have wireless communication means (not shown) integrated therein to facilitate communication to the remote databases 16, 18, 19.

According to another embodiment, the databases 16, 18, 19 may be internal to the urgency detection tool 14. In this regard, the tool 14 may have an internal memory to provide a storage capacity for storing the databases 16, 18, 19. The data included in the databases 14, 16, 19 may be stored on the tool 14 before the tool 14 is sold. In this manner, the databases 14, 16, 19 may be configured for use with a wide range of vehicles. Data compression techniques known in the art may be used to store the large amount of data that may be included in the databases 16, 18, 19. Alternatively, the databases 16, 18, 19 may be specifically configured for use with a particular vehicle or a group of vehicles. For instance, the databases 16, 18, 19 may have information related to a specific vehicle manufacturer, or for vehicles manufactured within a specific time period (i.e., range of years).

It is also contemplated that the databases 16, 18, 19 may be downloaded onto the tool 14 after purchase by a user. In one embodiment, the tool 14 may access a network to download the information for the databases 16, 18, 19. For instance, the tool 14 may be disposed in communication with a PC (i.e., via a USB cable) or cellphone to access the information over the Internet, or CD-ROM sold with the tool 14. The tool 14 may also have the capability to communicate directly with the Internet to download the information. The tool 14 may also download updates to the databases 16, 18.

Figure 2:
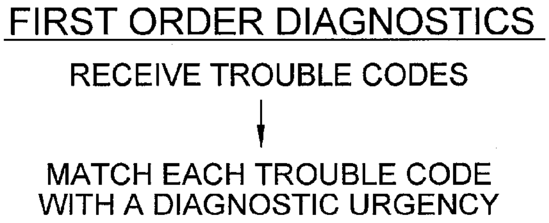
FIG. 2 is a flow chart for performing first order diagnostics.

According to one embodiment, and referring now to FIG. 2, the first urgency database 16 is configured to perform first order diagnostics. In this respect, the first urgency database 16 is configured to map each diagnostic trouble code received from the vehicle 12 to a respective urgency status. Thus, each trouble code downloaded from the vehicle 12 is analyzed by the first urgency database 16 to identify the urgency status associated with the respective trouble code. Therefore, if multiple trouble codes are received from the vehicle 12, the first urgency database 16 will generate multiple urgency statuses.

The architecture of the first urgency database may have many different forms. For instance, it is contemplated that the first urgency database 16 may include a listing of diagnostic trouble codes associated with a high urgency status, as well as trouble codes associated with a low urgency status.

Alternatively, the first urgency database 16 may only include diagnostic trouble codes associated with the high urgency status. In this respect, trouble codes received from the vehicle may be compared with the codes in the first urgency database. If none of the trouble codes downloaded from the vehicle 12 match with any of the codes found in the first urgency database 16, then the urgency status is low. Conversely, if at least one of the codes downloaded from the vehicle matches with the codes found in the first urgency database 16, then the urgency status is high.

It is additionally contemplated that the first urgency database 16 may only include a listing a trouble codes associated with low urgency status. Therefore, if some of the codes downloaded from the vehicle 12 are not found on the first urgency database 16, then the urgency status is high. However, if all of the codes downloaded from the vehicle 12 are listed in the first urgency database 16, then the urgency status is low.

Figure 3:
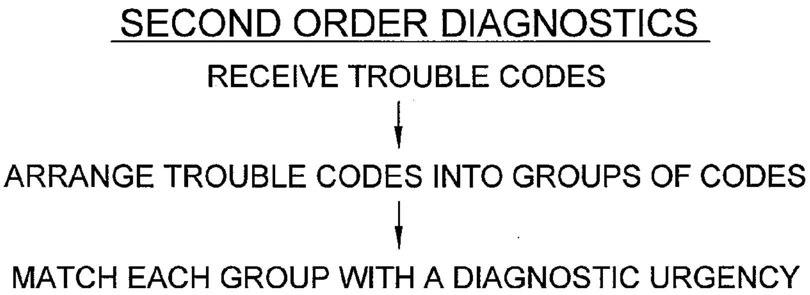
FIG. 3 is a flow chart for performing second order diagnostics.
Figure 4:
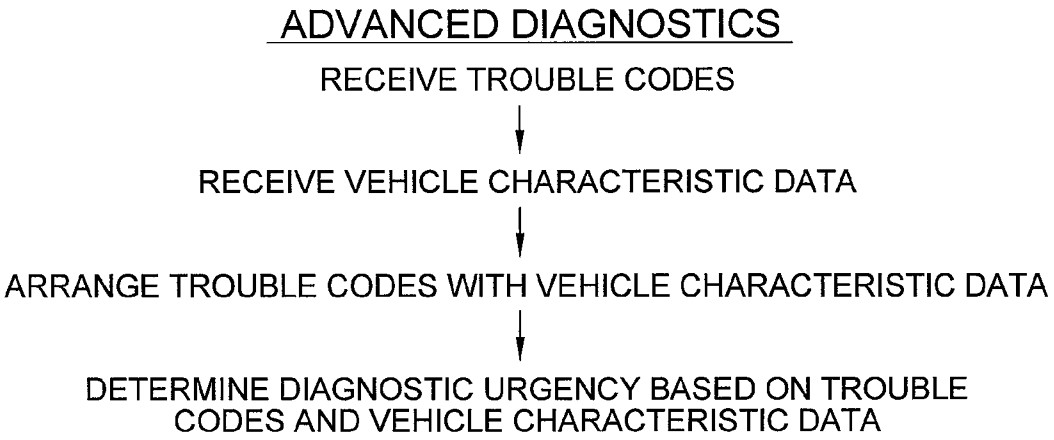
FIG. 4 is a flow chart for performing advanced diagnostics.

Referring now to FIG. 3, the second urgency database 18 is configured to perform second order diagnostics. The second urgency database 18 performs second order diagnostics by determining an urgency status for combinations of trouble codes. For instance, if trouble codes 101, 102, and 103 are received from the vehicle 12, the second urgency database 18 will determine an urgency status for all the combinations of trouble codes. In particular, an urgency status will be determined for the combination of codes 101 and 102, the combination of codes 101 and 103, the combination of codes 102 and 103, and finally, the combination of all the codes, 101, 102, and 103. In this regard, the second urgency database 18 may be configured to group the trouble codes into the various permutations of codes.

The architecture of the second urgency database 18 may be varied, similar to the first urgency database 16 discussed above. For instance, the second urgency database 18 may provide an urgency status for each combination of trouble codes. Alternatively, the second urgency database may only list combinations of trouble codes associated with a high urgency status or a low urgency status.

The second urgency database 18 may have sophisticated searching and matching capabilities. For instance, it may be desirable to focus the search to groups containing a particular trouble code (i.e., all combinations including the code 101). In this respect, the second urgency database may determine the urgency status for all groups including the 101 trouble code. The second urgency database 18 may also focus the search to groups containing a combination of trouble codes (i.e., all combinations including the combination of codes 101 and 102). As such, the second urgency database 18 may tailor the search to determine the urgency status for all groups include the 101 and 102 trouble codes.

The foregoing discusses organizing the first and second databases 16, 18 by urgencies associated with single codes (i.e., the first urgency database 16) or urgencies associated with groupings of codes (i.e., the second urgency database 18). However, it is also contemplated that the databases may be arranged by the urgency associated with the code(s). For instance, the first urgency database 16 may include code(s) associated with a low urgency, the second urgency database 18 may include codes associated with a medium urgency, and the third urgency database 19 may include codes associated with a medium urgency.

According to another embodiment, the system 10 may be configured to determine the urgency status as a function of certain vehicle characteristics, in addition to an analysis of the diagnostic trouble codes. A single trouble code may be associated with a "high" urgency status for one vehicle and a "low" urgency status for another vehicle. For instance, a diagnostic trouble code pertaining to a vehicle's balance bar may be highly urgent for a tall vehicle, and not as urgent for a shorter vehicle. Therefore, the urgency detection tool 14 may also be able to obtain vehicle characteristic data from the vehicle 12. The vehicle characteristic data may be downloaded by the urgency detection tool 14 from the onboard computer 20. Alternatively, the user may be asked to enter vehicle characteristic data into the urgency detection tool 14.

The vehicle characteristic data may include the vehicle identification number (VIN) which may be decoded to determine the year, manufacturer, make, and model of the vehicle. For more information about downloading and decoding the VIN number, please refer to U.S. patent application Ser. No. 12/501,698, entitled Handheld Automotive Diagnostic Tool with VIN Decoder, owned by Innova Electronic Corporation of Fountain Valley, Calif., the assignee of the present patent application. The capability of determining the urgency status based on vehicle characteristics allows the system 10 and the urgency detection tool 14 to be used in a universal capacity. Therefore, if a family owns two vehicles, the urgency detection tool 14 may be used on both vehicles.

It is contemplated that the first and/or second databases 16, 18, i.e., comparing devices may be configured to compare trouble codes based on certain vehicle characteristics. For instance, the databases 16, 18 may have separate "pages" arranged by certain vehicle characteristics (i.e., an SUV "page", a four-wheel drive "page", a "page" for vehicles manufactured in a certain year, etc.). In this respect, the databases 16, 18 would first determine which "page" to look at based on the vehicle being tested. Then, the databases 16, 18 would compare the trouble codes received from the vehicle 12 with the codes on that particular "page".

Figure 5:
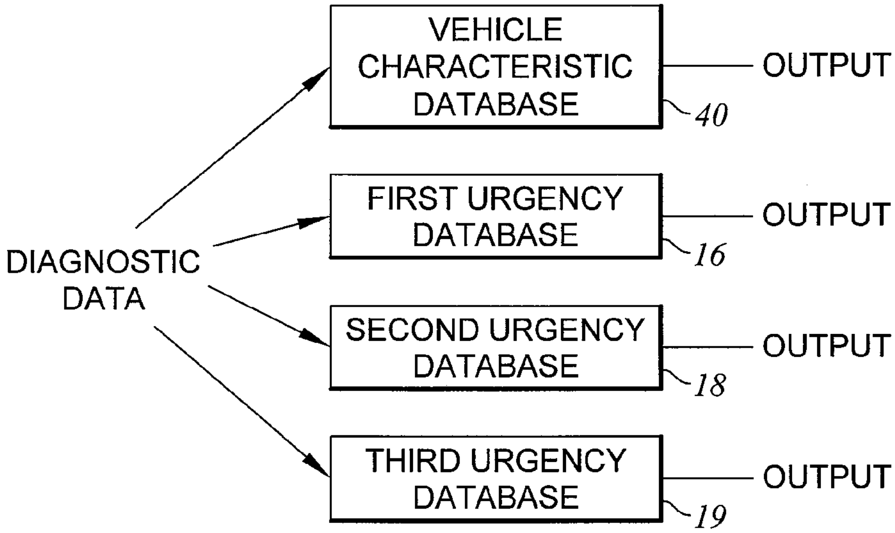
FIG. 5 is a schematic view of a system having a vehicle characteristic database, a first urgency database, and a second urgency database.

Referring now to FIG. 5, another embodiment of the system 10 may include a separate vehicle characteristic database 40 for determining the urgency status based upon one or more vehicle characteristics. In this respect, the vehicle characteristic database 40 may include a listing of codes classified by a respective vehicle characteristic. For instance, the vehicle characteristic database 40 may include a listing of trouble codes and combinations of codes that may be particularly problematic for four-wheel drive vehicles.

The vehicle characteristic database 40 may provide another level of analysis to determine the diagnostic urgency of the vehicle. Thus, if one of the first urgency database 16, second urgency database 18 or vehicle characteristic database 40 outputs a high urgency, then the overall urgency of the vehicle is high urgency. Conversely, if all of the databases 16, 18, 40 output a low urgency (which may simply be the absence of a high urgency output), then the overall urgency is low.

According to one embodiment, the databases 16, 18, 40 are compiled by a network of mechanics 30 (see FIG. 1). The mechanics may continuously update the databases 16, 18, 40 as new vehicles are produced, and as new data is gathered. In this regard, the databases 16, 18, 40 are based on the mechanic's own experience to provide information that is as accurate as possible. Along these lines, one embodiment includes "prior experience" databases 16, 18, 40. The information from the prior experience databases 16, 18, 40 may be prioritized by an urgency prioritizer 32 in accordance with prioritization rules. In general, the urgency prioritization rules may evaluate facts such as whether the of diagnostic trouble codes stored on the databases 16, 18, 40 include the same diagnostic trouble codes received from the vehicle 12; whether the stored combinations of diagnostic trouble codes include additional diagnostic trouble codes, other than diagnostic trouble codes from the vehicle 12; the successful diagnosis associated with each stored combination of diagnostic trouble codes and the associated fix. Evaluation of such factors, in accordance with the scenarios set forth below, allows the identification of a diagnostic urgency associated with the received diagnostic trouble codes.

With the basic structural components of the system 10 described above, the following discussion will focus on the method of determining the urgency status for the vehicle 12. The user disposes the urgency detection tool 14 in communication with the vehicle 12. The communication may be facilitated by wired or wireless means. The diagnostic trouble codes are then downloaded from the vehicle 12 onto the urgency detection tool 14, which communicates the trouble codes to the first urgency database 16 for first order diagnostics. The first urgency database 16 matches each trouble code with an urgency status. The urgency status may be classified as "high" or "low". An urgency status of "middle" may be available in some embodiments. The diagnostic trouble codes are also uploaded to the second urgency database 18 for second order diagnostics. The second urgency database 18 divides the diagnostic trouble codes into separate groups of codes, and assigns an urgency status to each group.

The results from the first urgency database 16 and second urgency database 18 are then communicated back to the urgency detection tool 14 to display the results to the user. In order to have an overall "low" urgency status, all of the results from the first urgency database 16 and second urgency database 18 must be associated with a "low" urgency status. If one of the trouble codes, or groupings of trouble codes are associated with a "high" urgency status, then the overall urgency status is "high". Similarly, if all of the trouble codes, or groupings of trouble codes are associated with a "low" urgency status except for at least one trouble code being associated with an "medium" urgency status, then the overall urgency status is "medium". In this regard, the first and second urgency databases 16, 18 may generate and transmit an urgency command signal to the urgency indicator 28 for communicating the overall urgency status to the user. The urgency command signal may relate to an overall "high" urgency status, a "medium" urgency status, or a "low" urgency status.

The overall urgency status is displayed by the urgency detection tool 14 on the urgency indicator 28. The urgency indicator 28 may include a "high" indicator, a "medium" indicator, and a "low" indicator. The "high" indicator may include a red light, suggesting to the user that the user stop and address the diagnostic condition of the vehicle before continuing to drive the vehicle 12. The "medium" urgency indicator may be associated with a yellow light to suggest to the user to exert caution should the user decide to drive the vehicle 12 before addressing the diagnostic condition. The "low" urgency indicator may be associated with a green light to suggest to the user that the user may proceed without worrying about an urgent diagnostic condition. It is further contemplated that the urgency indicator 28 may only include a single light which communicates the urgency status by varying the brightness of the light emitted therefrom, or the frequency at which the light blinks. In other words, a bright light may correspond to a high urgency, while a dim light may correspond to a low urgency, and vice versa.

The urgency indicator 28 may also produce a sound associated with each urgency status. For instance, the urgency indicator may produce distinguishable alarms for a "high" urgency status, a "medium" urgency status, or a "low" urgency status. The different sounds may be distinguishable based on the type of sound emitted, the frequency of sound emitted, or the loudness of the sound emitted.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of identifying an urgency of treating a diagnostic condition of a vehicle, the vehicle including an on-board computer having at least one diagnostic trouble code stored thereon, the method comprising the steps of:

a) forming a first urgency database listing a plurality of diagnostic trouble codes, wherein each diagnostic trouble code is associated with a respective first urgency status, the first urgency status being one of a low urgency and a high urgency;

b) wherein the first urgency database is a vehicle specific characteristic database such that the determination of the first urgency status is based on a vehicle characteristic specific evaluation of urgency status of the at least one diagnostic trouble code individually;

c) forming a second urgency database listing a plurality of combinations of diagnostic trouble codes, wherein each combination of diagnostic trouble codes is collectively associated with a respective second urgency status, the second urgency status being one of a low urgency and a high urgency;

d) receiving, in a tool, the at least one diagnostic trouble code;

e) comparing, in a comparing device, the at least one diagnostic trouble code received in the tool to information stored in the first urgency database to determine a first urgency status, based upon consideration of the digital trouble codes individually;

f) when the tool receives a plurality of trouble codes, comparing, in the comparing device, the diagnostic trouble codes received in the tool to information stored in the second urgency database to determine a second urgency status, based upon consideration of a combination of digital trouble codes; and g) generating, in the comparing device, a high urgency indicator signal in response to high urgency status resulting from comparison of the diagnostic trouble codes to the first diagnostic database and the second diagnostic database.

2. The method recited in claim 1, further comprising the step of providing an urgency indicator in communication with the comparing device, the urgency indicator being configured to emit a high urgency alert signal in response to generation of the high urgency indicator signal.

3. The method recited in claim 2, wherein the high urgency alert signal includes a red light.

4. The method recited in claim 3, wherein the red light blinks multiple times in response to generation of the high urgency indicator signal.

5. The method recited in claim 1, further comprising the step of generating a low urgency indicator signal in response to low urgency status resulting from comparison of the diagnostic trouble codes to the first diagnostic database and the second diagnostic database.

6. The method recited in claim 5, further comprising the step of generating a medium urgency indicator signal in response to medium urgency status resulting from comparison of the diagnostic trouble codes to the first diagnostic database and the second diagnostic database, medium urgency status occurring when the comparison of the diagnostic trouble codes to the first diagnostic database and the second diagnostic database does not result in the high urgency status or the low urgency status.

7. The method recited in claim 5, further comprising the step of providing an urgency indicator in communication with the comparing device, the urgency indicator being configured to emit a low urgency alert signal in response to generation of the low urgency indicator signal.

8. The method recited in claim 1, wherein the vehicle characteristic specific evaluation is based upon a consideration of the vehicle model.

9. The method recited in claim 1, wherein the vehicle characteristic specification evaluation is based upon a consideration of the vehicle identification number.

10. The method recited in claim 1, wherein the second urgency database is a vehicle characteristic database such that the determination of the second urgency status is based on a vehicle characteristic specific evaluation of urgency status of the combination of diagnostic trouble codes.

11. A method of identifying an urgency of treating a diagnostic condition of a vehicle under test, the vehicle including an on-board computer having at least one diagnostic trouble code stored thereon, the method comprising the steps of:

a) forming a first urgency database listing a plurality of diagnostic trouble codes, wherein each diagnostic trouble code is associated with a respective first urgency status, the first urgency status being one of a low urgency and a high urgency;

b) receiving, in a tool, the diagnostic trouble codes and vehicle characteristic data associated with the vehicle under test;

c) comparing, in a comparing device, the diagnostic trouble codes received in the tool to information stored in the first urgency database to determine a first urgency status;

d) generating a high urgency indicator signal where a first high urgency status results from comparison of the received trouble codes to the first diagnostic database;

e) forming a second urgency database listing a plurality of vehicle specific diagnostic trouble codes, wherein the vehicle specific diagnostic trouble codes are associated with stored vehicle characteristic data and vehicle specific second urgency status, the second urgency status being one of a low urgency and a high urgency; and f) generating a high urgency indicator signal where a second high urgency status results from comparison of the received diagnostic trouble codes and vehicle characteristic data associated with the vehicle under test to the second diagnostic database.

12. The method recited in claim 11, further comprising the step of providing an urgency indicator configured to emit a high urgency alert signal in response to generation of the high urgency indicator signal.

13. The method recited in claim 12, wherein the high urgency alert signal includes a red light.

14. The method recited in claim 11, wherein the second urgency status is variable in response to vehicle characteristics defined by the vehicle.

15. The method recited in claim 14, wherein the vehicle characteristics includes the vehicle model.

16. The method recited in claim 14, wherein the vehicle characteristics are derivable from a vehicle identification number.

17. A diagnostic urgency tool for determining an urgency associated with a diagnostic condition of a vehicle under test, the vehicle having an onboard computer for storing diagnostic trouble codes, and vehicle characteristic information, the diagnostic urgency system comprising:

a tool connector connectable with the onboard computer to download the diagnostic trouble codes and vehicle characteristic data from the onboard computer of the vehicle under test;

a first urgency database in operative communication with the tool connector, the first urgency database listing diagnostic trouble codes normally associated with a high urgency status and trouble codes associated with a high urgency status only when received from a vehicle identified by specific vehicle characteristic data; and an urgency indicator in communication with the first urgency database, the urgency indicator being configured to activate a high urgency signal where any of the diagnostic trouble codes downloaded from the onboard computer conform to any of the diagnostic trouble codes listed in the first urgency database that are normally associated with a high urgency status, or where any of the downloaded diagnostic trouble codes are associated with a high urgency status for the vehicle under test.

18. The diagnostic urgency tool recited in claim 17, wherein the urgency indicator is configured to activate a low urgency signal when none of the downloaded diagnostic trouble codes conform to any of the diagnostic trouble codes listed in the first urgency database that are associated with a high urgency status.

19. The diagnostic urgency tool recited in claim 17, wherein the high urgency signal is a sound.

20. The method as recited in claim 1 wherein the high urgency indicator signal is generated when any of the received diagnostic trouble codes are individually associated with high urgency status in the first urgency database, or when the combination of received diagnostic trouble codes is collectively associated with a high urgency status in the second urgency database.

21. The method as recited in claim 20 further comprising the step of receiving information identifying vehicle characteristic data, wherein the first urgency database further associates a high urgency status with select individual digital trouble codes only when received from vehicles identified by specific vehicle characteristics.

22. The method as recited in claim 21 further including the step of determining the first urgency status proceeds by evaluating the urgency status of each received diagnostic trouble code in the combination with evaluating characteristic data received from the vehicle.

23. The method recited in claim 1, wherein the comparing device is a scan tool.

24. The method recited in claim 1, wherein the comparing device is a cellphone.

* * * * *

UNITED STATES PATENT AND TRADEMARK OFFICE

CERTIFICATE OF CORRECTION

PATENT NO. : 8,825,270 B2
APPLICATION NO. : 12/721005
DATED : September 2, 2014
INVENTOR(S) : Ieon C. Chen It is certified that error appears in the above-identified patent and that said Letters Patent is hereby corrected as shown below:

On the title page, correction of the spelling of the inventor's first name

(75) Inventor: --I--eon C. Chen, Laguna Hills, CA (US)

Signed and Sealed this
Sixth Day of January, 2015

Michelle K. Lee

Michelle K. Lee
*Deputy Director of the United States Patent and Trademark Office*